US012704014B2

(12) United States Patent
Grimaldi

(10) Patent No.: US 12,704,014 B2
(45) Date of Patent: Aug. 11, 2026

(54) DOOR HAVING AT LEAST ONE SLIDING SASH AND ONE HINGED SASH

(71) Applicant: OPACMARE S.P.A., Rivalta di Torino (IT)

(72) Inventor: Michele Grimaldi, Piossasco (IT)

(73) Assignee: OPACMARE S.P.A., Rivalta di Torino (IT)

( * ) Notice: Subject to any disclaimer, the term of this patent is extended or adjusted under 35 U.S.C. 154(b) by 0 days.

(21) Appl. No.: 18/939,619

(22) Filed: Nov. 7, 2024

(65) Prior Publication Data

US 2025/0146345 A1 May 8, 2025

(30) Foreign Application Priority Data

Nov. 7, 2023 (IT) ........................ 102023000023370

(51) Int. Cl.
*E05D 15/48* (2006.01)

(52) U.S. Cl.
CPC ........ *E05D 15/48* (2013.01); *E05D 2015/485* (2013.01); *E05Y 2900/514* (2013.01)

(58) Field of Classification Search
CPC ..... E05D 15/58; E05D 15/0604; E05D 15/48; E05D 2015/485; E06B 3/5072; E06B 3/5054; E06B 3/509; E06B 1/70–702; E05Y 2900/132; E05Y 2201/22
See application file for complete search history.

(56) References Cited

U.S. PATENT DOCUMENTS 2,818,614 A * 1/1958 Lapka, Jr. ................. E06B 1/70 D25/48.2
3,750,334 A * 8/1973 Slaybaugh .......... E05D 15/0604 49/177
5,749,172 A * 5/1998 Isopahkala .............. E05D 15/58 49/127

(Continued)

FOREIGN PATENT DOCUMENTS

DE 2502765 A1 * 1/1975
KR 200410198 Y1 * 3/2006 ........... E06B 3/5054

(Continued)

OTHER PUBLICATIONS

Translation of EP 3034735 (Year: 2016).*
Search Report for IT 202300023370 dated May 21, 2024, The Hague, NL.

*Primary Examiner* — Daniel P Cahn
*Assistant Examiner* — Patrick B. Ponciano
(74) *Attorney, Agent, or Firm* — ArentFox Schiff LLP; Michael Fainberg

(57) ABSTRACT

Provided is a door which has a first sash, at least a second sash slidable along rails, and at least one automatic fastening device for automatically fastening the at least one second sash to the first sash when the at least one second sash reaches an engagement position with an abutment part of the first sash. A control system moves the rails relative to frame cross-pieces between a forward position in which the rails are engageable with the at least one second sash, and a retracted position in which the rails are non-interfering with the at least one second sash, allowing a sash pack formed by the first sash and the at least one second sash fastened to the first sash to rotate about a vertical axis.

12 Claims, 14 Drawing Sheets

(56) References Cited

U.S. PATENT DOCUMENTS

| | | | | |
|---|---|---|---|---|
| 6,170,195 | B1 * | 1/2001 | Lim | E05D 15/58 49/141 |
| 6,422,287 | B1 * | 7/2002 | Wilke | E05D 15/58 160/195 |
| 7,451,802 | B2 * | 11/2008 | Cianciolo | E05D 15/08 160/225 |
| 8,096,342 | B2 * | 1/2012 | Scruggs | E05D 15/08 160/218 |
| 8,756,864 | B2 * | 6/2014 | Hamaker | E05D 15/48 49/168 |
| 9,194,172 | B2 * | 11/2015 | Rees | E05D 15/58 |
| 9,816,311 | B2 * | 11/2017 | Reyes | E06B 1/70 |
| 10,280,678 | B1 * | 5/2019 | Rendon, Jr. | E06B 3/509 |
| 10,407,960 | B2 * | 9/2019 | Wolfe | E05B 65/0085 |
| 11,098,514 | B2 * | 8/2021 | Vander Bent, Jr. | E05D 15/58 |
| 2007/0069524 | A1 * | 3/2007 | Lin | E05D 15/58 292/175 |
| 2011/0094161 | A1 * | 4/2011 | Rees | E05D 15/58 49/260 |
| 2011/0265386 | A1 * | 11/2011 | Dunstan | E06B 1/70 49/506 |
| 2017/0204644 | A1 * | 7/2017 | McMullen, Jr. | E06B 3/5072 |
| 2018/0223573 | A1 | 8/2018 | Wolfe | |

FOREIGN PATENT DOCUMENTS

| | | | | | |
|---|---|---|---|---|---|
| KR | 100621644 | B1 | * | 9/2006 | E06B 3/50 |
| KR | 100741813 | B1 | | 7/2007 | |
| KR | 20090006190 | U | * | 6/2009 | E06B 3/5054 |
| KR | 20150006588 | A | * | 1/2015 | E06B 3/28 |
| KR | 20150006589 | A | * | 1/2015 | E06B 3/28 |
| KR | 20220065281 | A | * | 5/2022 | E06B 3/5009 |

* cited by examiner

FIG.1
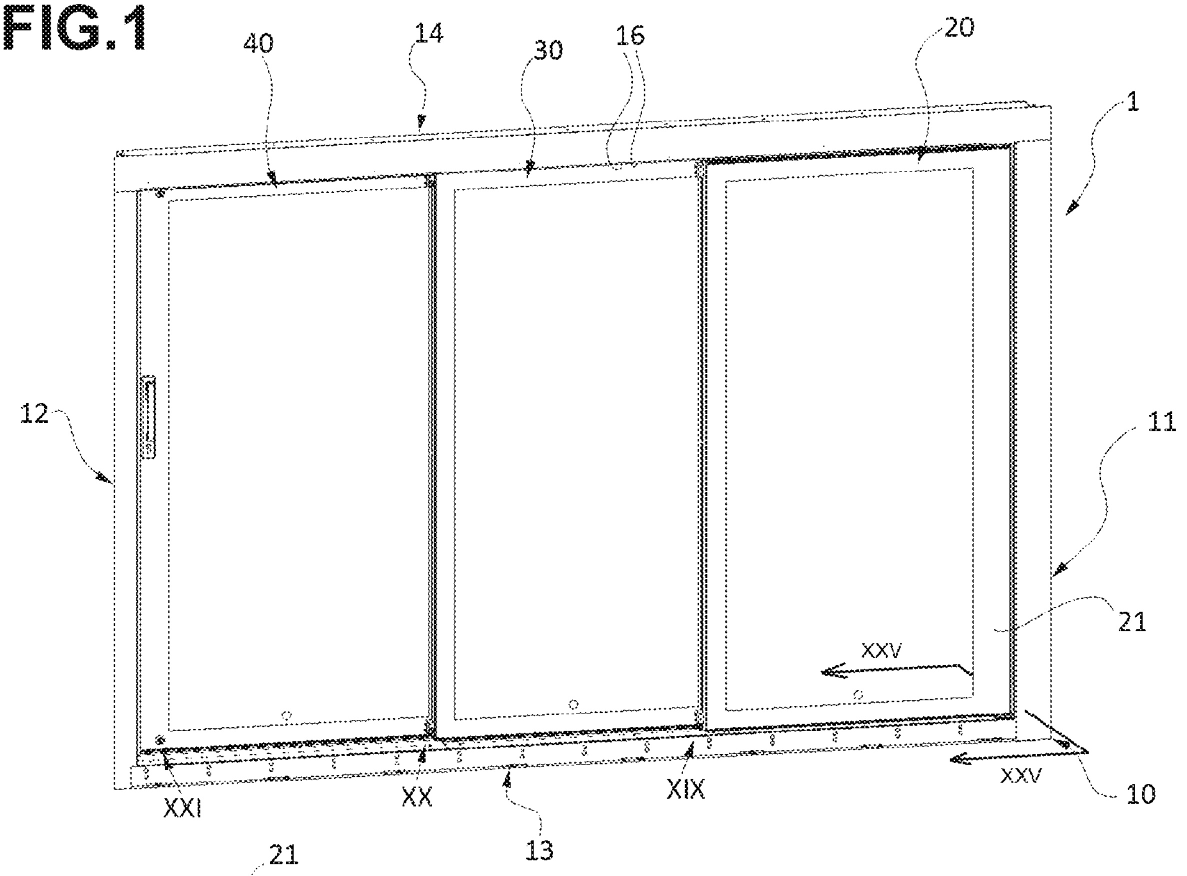
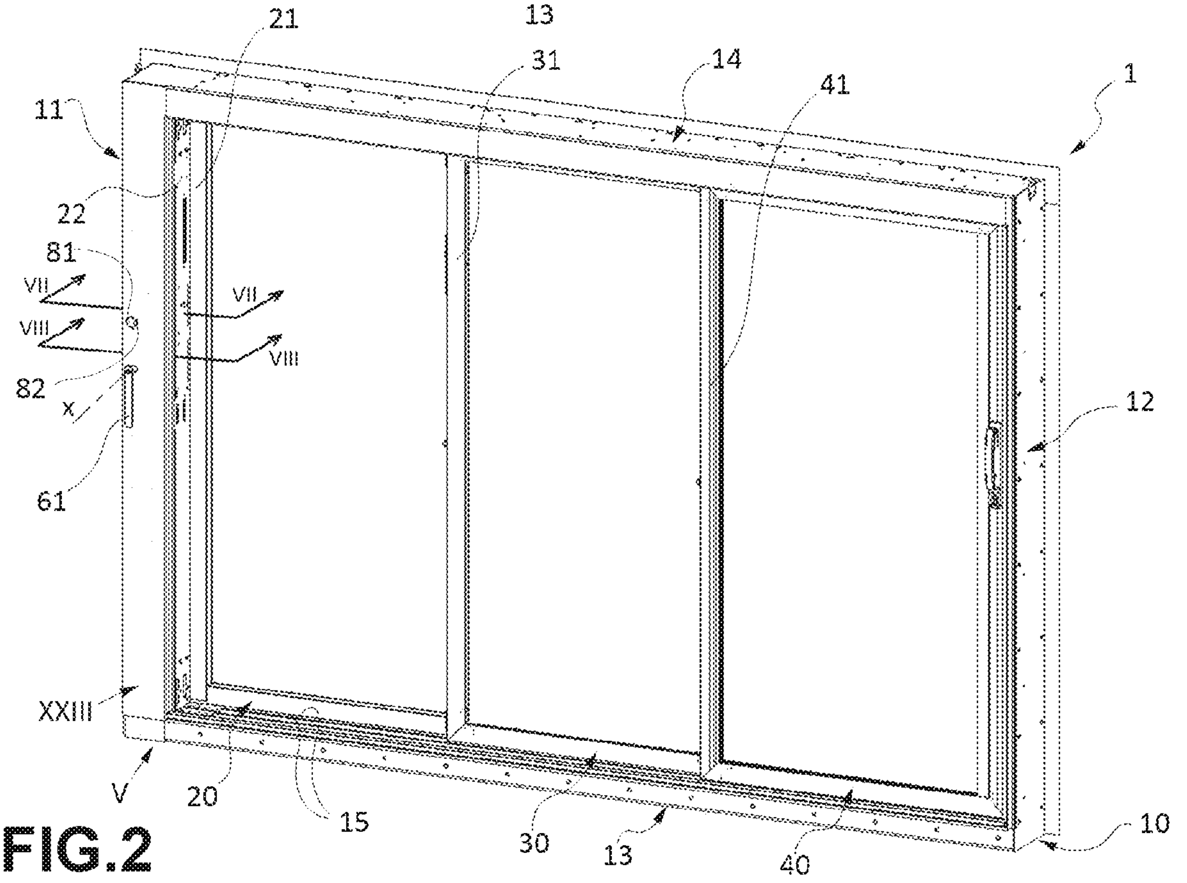
FIG.2

FIG.3
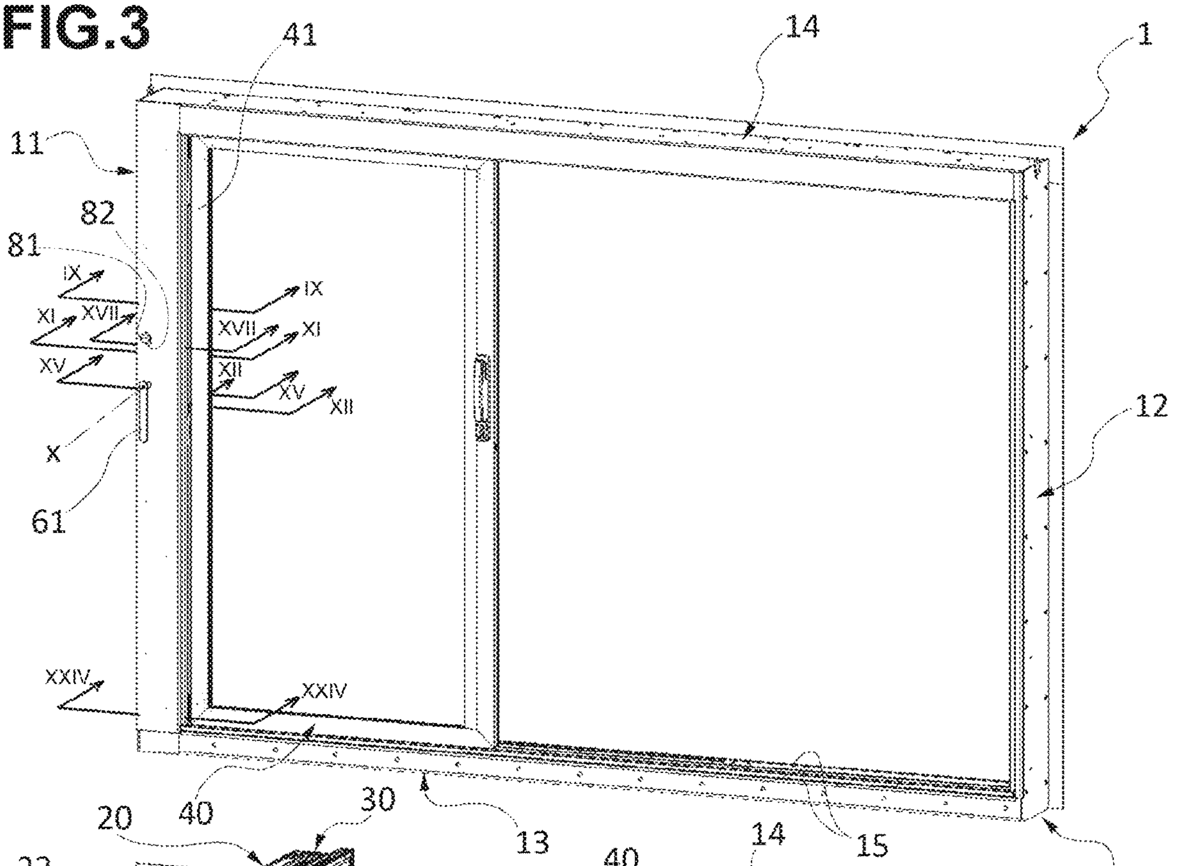
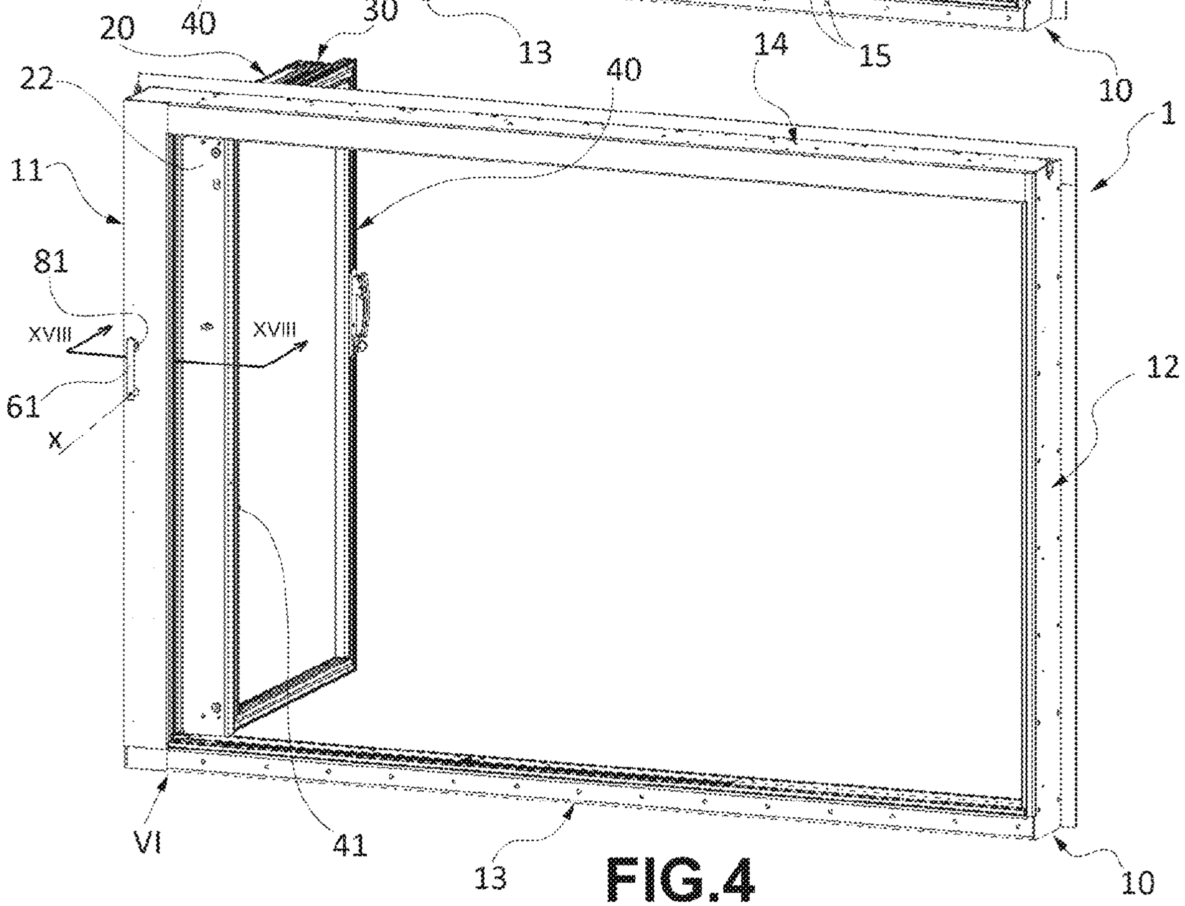
FIG.4

FIG.5
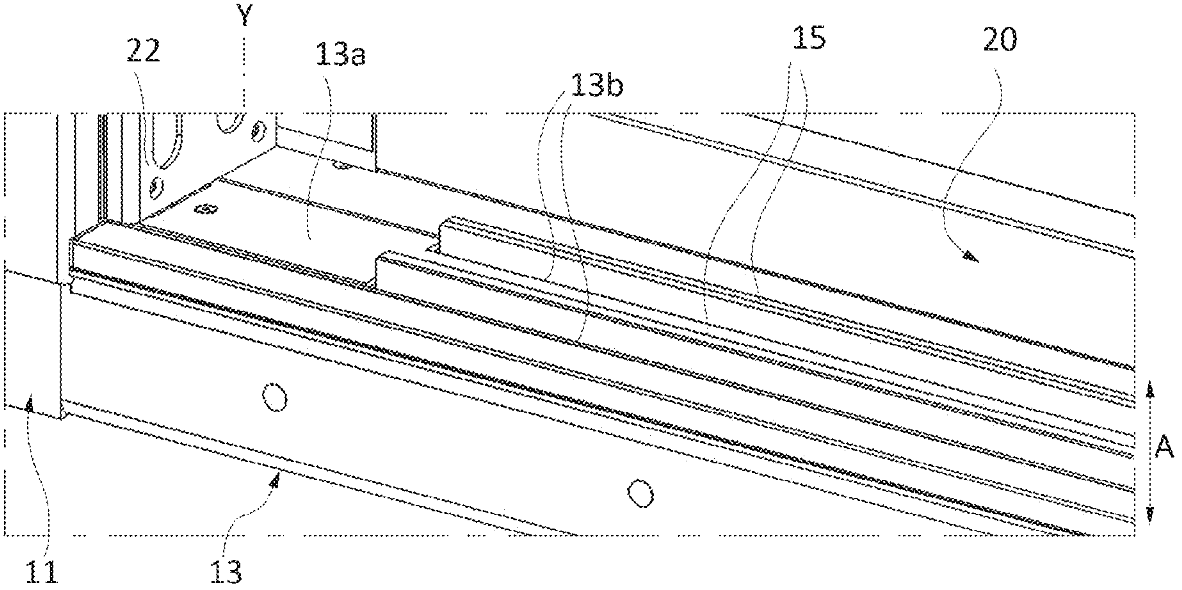
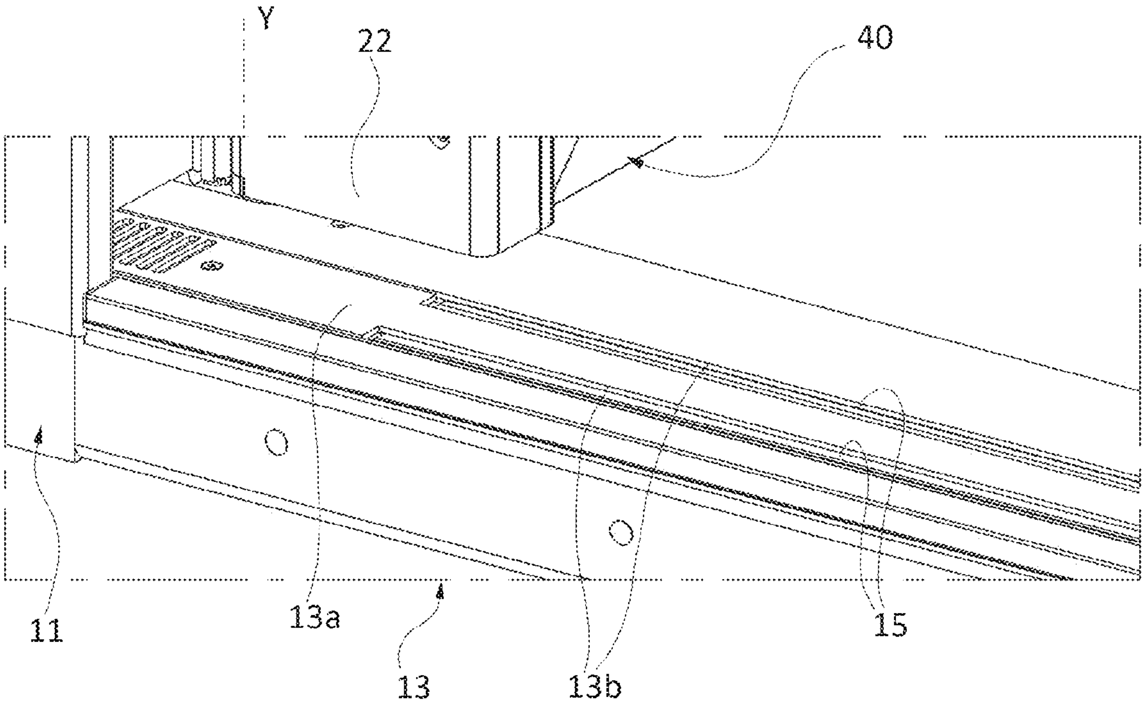
FIG.6

FIG.15
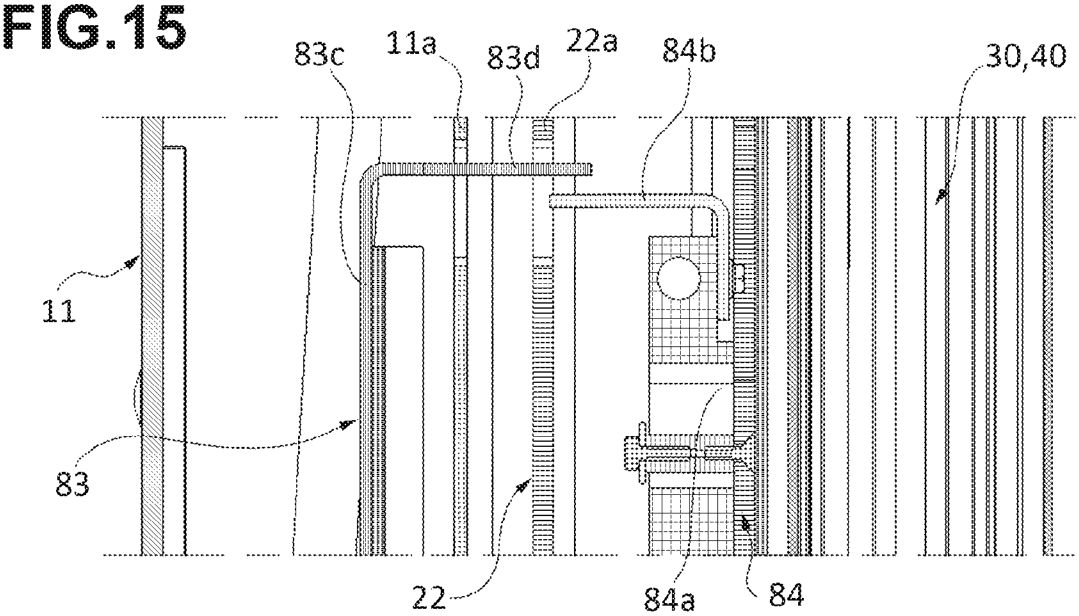
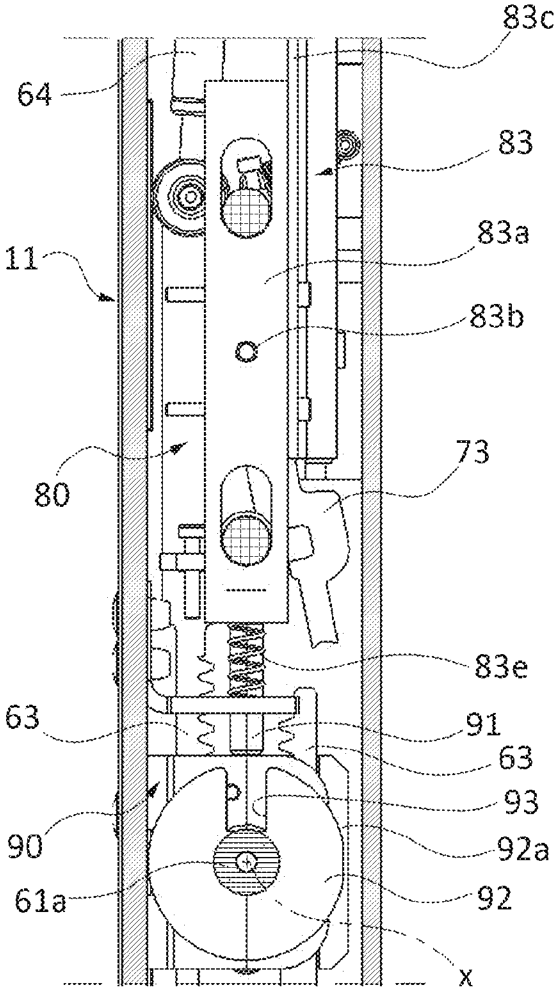
FIG.16

FIG.23
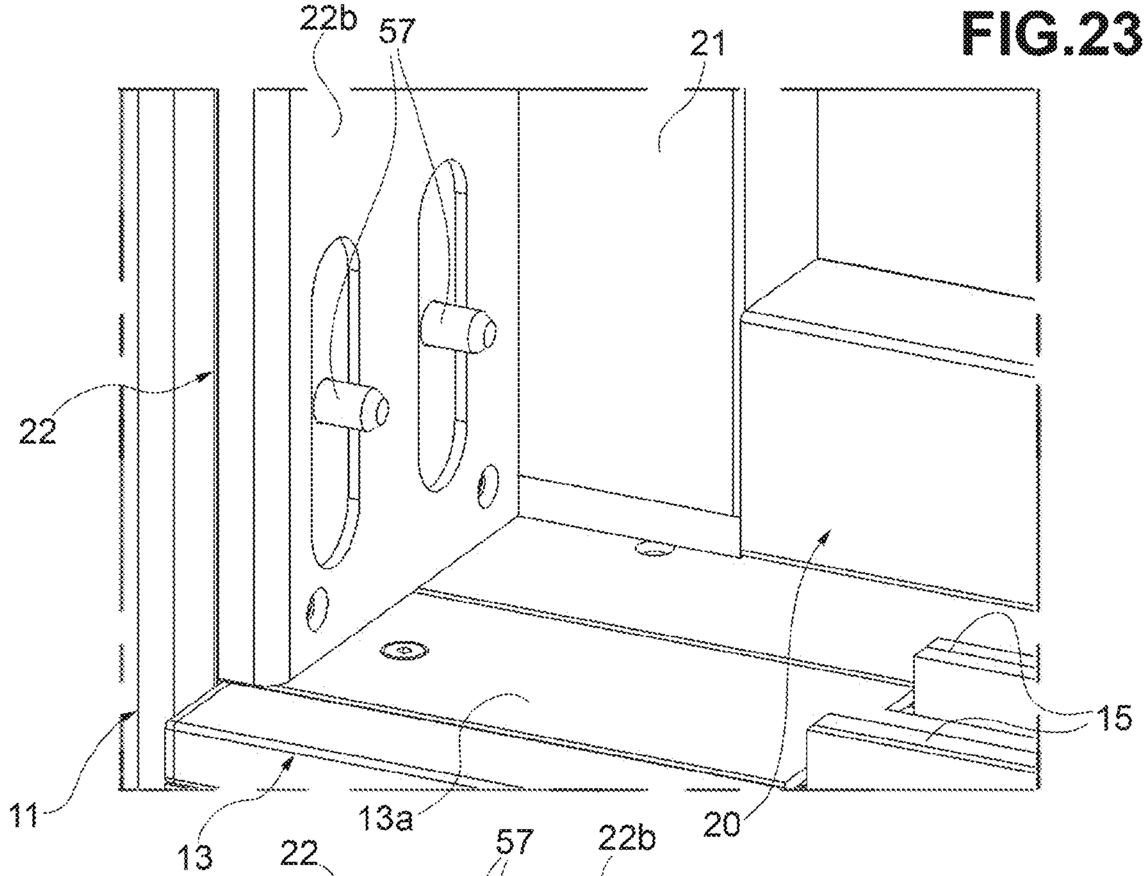
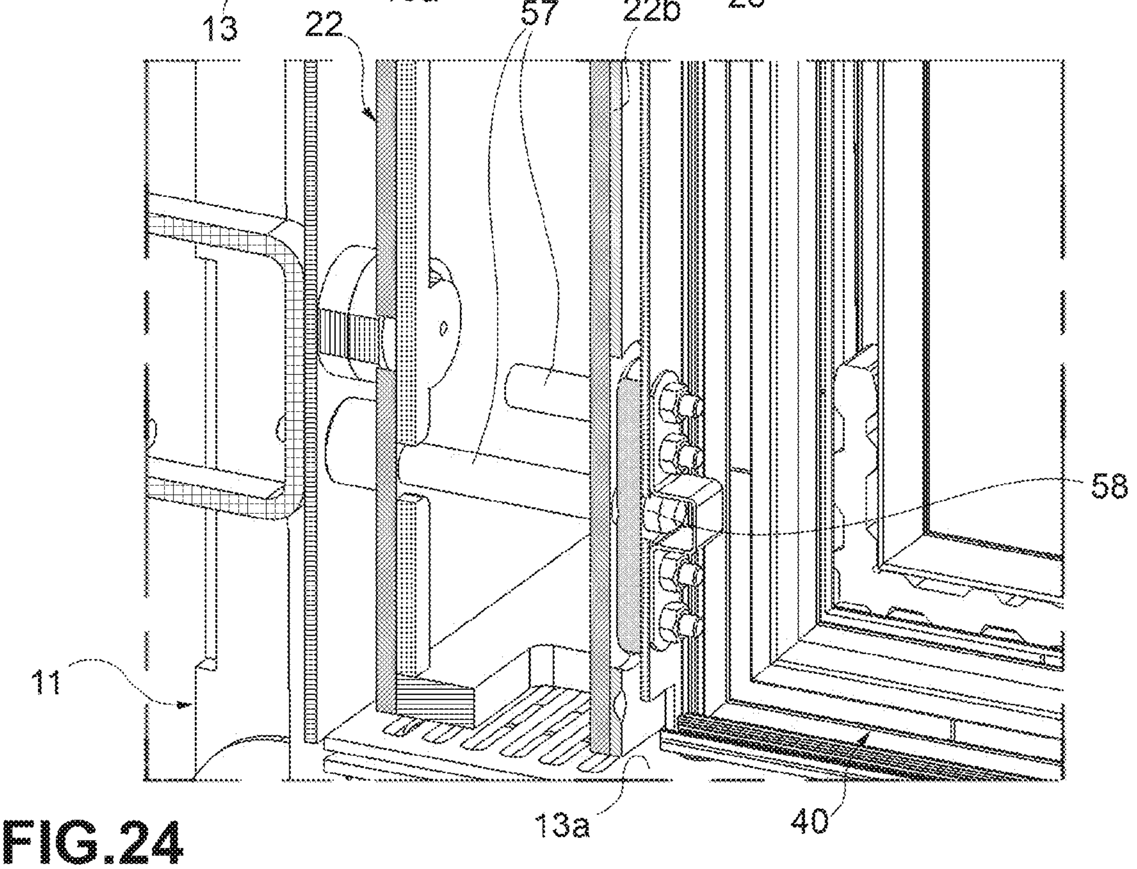
FIG.24

DOOR HAVING AT LEAST ONE SLIDING SASH AND ONE HINGED SASH

CROSS-REFERENCE TO RELATED APPLICATION

This application claims priority to Italian Patent Application No. 102023000023370 filed on Nov. 7, 2023, the contents of which are incorporated by reference in their entirety.

FIELD OF THE INVENTION

The present invention relates to a door of the type comprising a frame, a first sash mounted at a first upright of the frame, and at least a second sash mounted slidable along rails arranged on cross-pieces of the frame. In the open position, the second sash overlaps the first sash.

BACKGROUND OF THE INVENTION

In the nautical field, sliding doors are widely used, generally provided with glass, to allow communication between the inner and outer spaces of boats. Sliding doors are greatly used particularly in boats such as yachts insofar as they allow for extensive communication between spaces. There is a need to further increase such communicability, thereby rendering the inner and outer spaces in the form of a single space.

SUMMARY OF THE INVENTION

One object of the present invention is to provide a door of the above-described type that is capable of satisfying the requirements cited above.

Such object is achieved according to the present invention by a door comprising:

- a frame comprising a pair of uprights and a pair of crosspieces interconnecting opposite ends of said uprights, respective rails being arranged in said cross-pieces,
- a first sash mounted at a first upright of the pair of uprights and configured to rotate about a vertical axis, between a closed position and an open position,
- at least one second sash slidingly mounted along said rails, wherein said at least one second sash is displaceable by sliding between a first position distant from said first upright and a second position adjacent to said first upright, wherein in the second position said at least one second sash is engageable with an abutment part of the first sash,
- at least one automatic fastening device arranged partly on the abutment part of the first sash and partly on said at least one second sash and configured to automatically fasten said at least one second sash to the abutment part of the first sash when said at least one second sash reaches the second position when sliding towards the second position, and
- a control system arranged in the frame and operable to move said rails with respect to the respective cross-pieces, between a forward position in which the rails are engageable with at least one second sash, and a retracted position in which the rails are non-interfering with said at least one second sash, allowing a sash pack formed by said first sash and by said at least one second sash fastened to the first sash to rotate about said vertical axis.

The sash pack formed by the first sash and the second sliding sash(s) may be made to rotate about a vertical axis once it has been liberated from the presence of the rails, thereby allowing the opening surrounded by the door frame to be almost completely cleared. This, consequently, makes it possible to eliminate practically every barrier between the spaces that are separated by the door in question.

Preferred embodiments of the present invention are defined in the dependent claims.

BRIEF DESCRIPTION OF THE FIGURES

Further features and advantages of the door according to the present invention will become apparent from the following detailed description of an embodiment of the invention, made with reference to the accompanying drawings, provided purely for illustrative and non-limiting purposes, wherein:

FIG. 1 is a perspective view from the outer side of a door according to the present invention in the closed position, FIG. 2 is a perspective view from the inner side of the door according to the present invention in the closed position, FIG. 3 is a perspective view from the inner side of the door according to the present invention with the sliding sashes in the open position, FIG. 4 is a perspective view from the inner side of the door according to the present invention with the sash pack rotated to the open position, FIGS. 5 and 6 are enlarged scale views of a detail respectively denoted by the arrow V in FIG. 2 and by the arrow VI in FIG. 4, FIG. 15 is a cross-sectional view of a detail of the door in FIG. 3 (the view of FIG. 15 is taken along line XV-XV of FIG. 3), FIG. 16 is a sectional view of a part of the upright of the frame, showing components of a release system, FIG. 23 is an enlarged scale view of a detail denoted by the arrow XXIII in FIG. 2, FIG. 24 is a cross-sectional perspective view of the detail in FIG. 23 in the condition wherein the sashes are grouped together (the view of FIG. 24 is taken along line XXIV-XXIV of FIG. 3)

DETAILED DESCRIPTION

Figure 7:
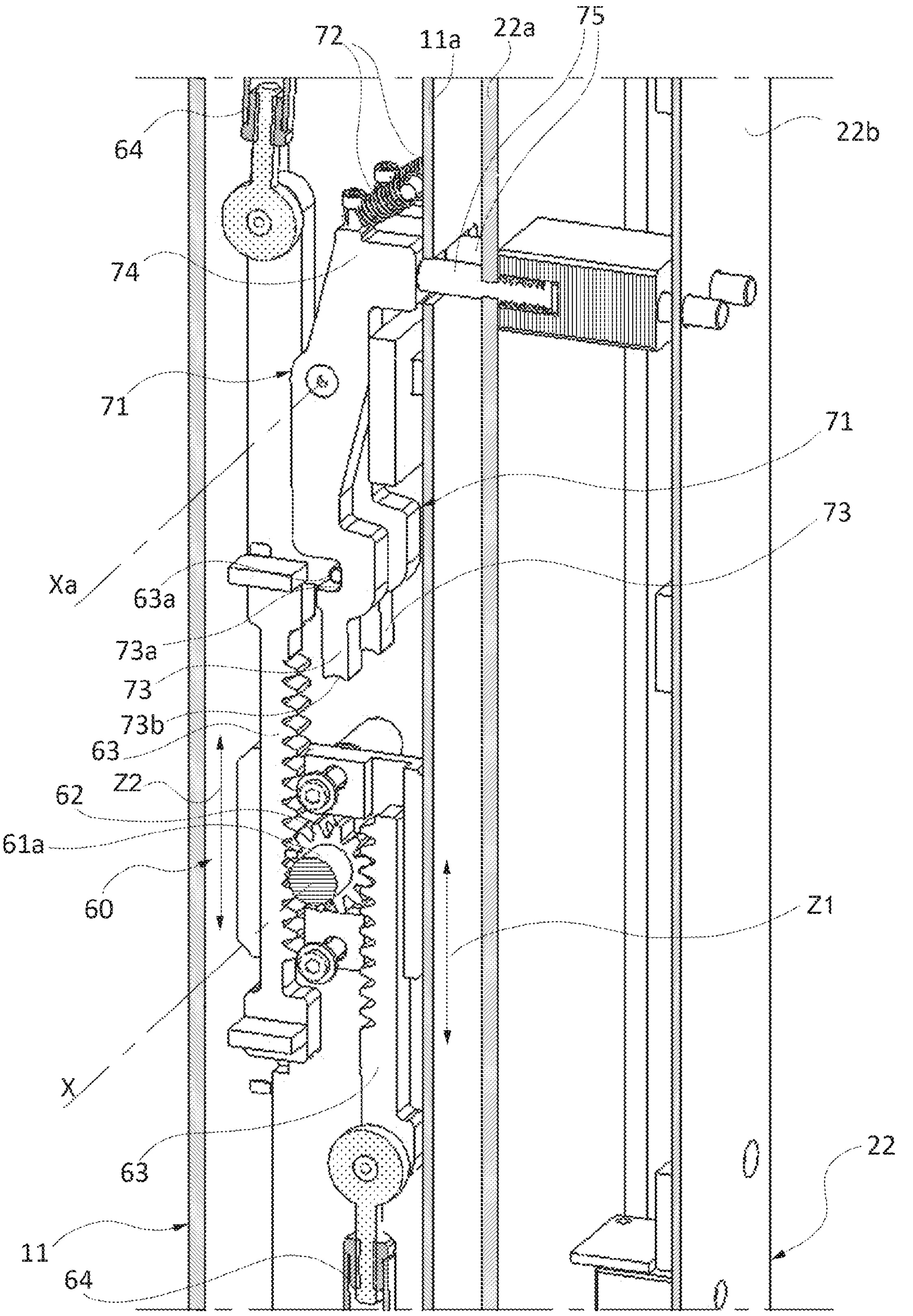
FIG. 7 is a cross-sectional perspective view of a part of an upright of the frame and a hinged sash of the door, showing components of a control system and a related safety system (the view of FIG. 7 is taken along line VII-VII of FIG. 2)

With reference to FIGS. 1 to 4, an example of a door, indicated as a whole with the numeral 1, is shown, made in the form of a glass door having three movable sashes, adapted to be mounted to a wall of a room of a boat. The view of FIG. 1 is taken from an outer side of the door (intended as the outside of an environment delimited by the door), while the views of FIGS. 2-4 are taken from an inner side of the door (intended as the inside of the aforesaid environment). The expressions "inner side of the door" and "outer side of the door" are used for ease of presentation, and are not intended to be limiting.

The door 1 comprises a main frame 10, adapted to be mounted to said wall (not shown) in such a way as to surround an opening formed in said wall. The main frame 10 comprises a pair of vertical elements or uprights 11, 12 and a pair of horizontal elements or cross-pieces 13, 14, interconnecting opposite ends of the uprights 11, 12.

Arranged on the cross-pieces 13, 14 are lower and upper rails 15, 16 for sliding sashes (a pair of rails for each sliding sash), configured to couple with corresponding sliding elements (not shown) integral with the sliding sashes. FIGS. 5 and 6 show the rails 15 arranged within the lower cross-piece 13. As may be seen, such rails 15 are movable vertically according to the direction indicated by the arrow A, between a forward position (FIG. 5) in which the rails 15 are engageable with the sliding sashes, and a retracted position (FIG. 6) in which the rails 15 do not interfere with the sliding sashes. As may be seen, in the forward position of FIG. 5, the rails 15 protrude with respect to a top wall 13*a* of the lower cross-piece 13, extending through slots 13*b* formed in said top wall 13*a*. In the retracted position of FIG. 6, the rails 15 are retracted so as to have the top thereof inside the slots 13*b*. Although this is not shown in the figures, it is understood that the rails 16 arranged within the upper cross-piece 14 have the same arrangement as described above.

As mentioned above, the door 1 further comprises three movable sashes 20, 30, 40. The first one of the sashes, indicated with 20, is pivoted to the frame 10 of the door 1, by means of pins (not shown) which fasten the first sash 20 to the two cross-pieces 13, 14 of the frame 10. The first sash 20 is therefore configured to be able to rotate, under certain conditions, about a vertical axis Y (shown in FIGS. 5 and 6), between a closed position (shown in FIGS. 3 and 5) and an open position (shown in FIGS. 4 and 6). The other two sashes, indicated by 30 and 40 and hereinafter also referred to as the second sashes, are of the sliding type with respect to the main frame 10, and are substantially identical one to the other. Each of the movable sashes 20, 30, 40 comprises a sash frame, adapted to be mounted on the main frame 10 of the door. The sash frame also comprises a pair of vertical elements or uprights and a pair of horizontal elements or cross-pieces interconnecting opposite ends of said uprights. In the figures, only the uprights of the sashes 20, 30, 40 that face the upright 11 of the main frame 10, which will be referred to as the first upright, are marked by numbers, respectively 21, 31, 41.

In the example shown, the uprights and cross-pieces of each sash may be arranged to mount a sheet of transparent or translucent material, such as glass.

The number of sliding sashes may be different from that of the example shown in the figures, for example only one sliding sash or more than two sliding sashes. In the event that there are two or more sliding sashes, the sliding sashes may be fastened to each other in such a way that, by manually dragging one of them, the others are subsequently dragged therefrom until the position shown in FIG. 3 is reached.

Figure 26:
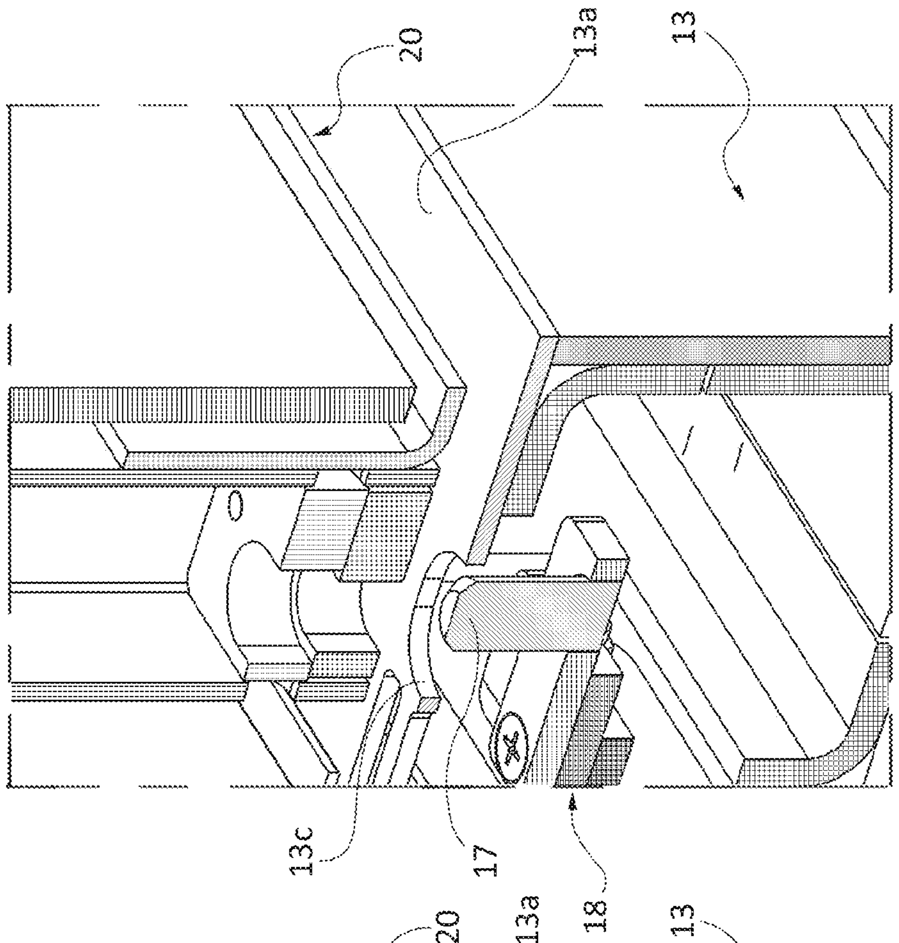
FIGS. 25 and 26 are cross-sectional perspective views of a detail of the door, in the forward and retracted positions, respectively (the view of FIG. 25 is taken along line XV-XV of FIG. 1)
Figure 25:
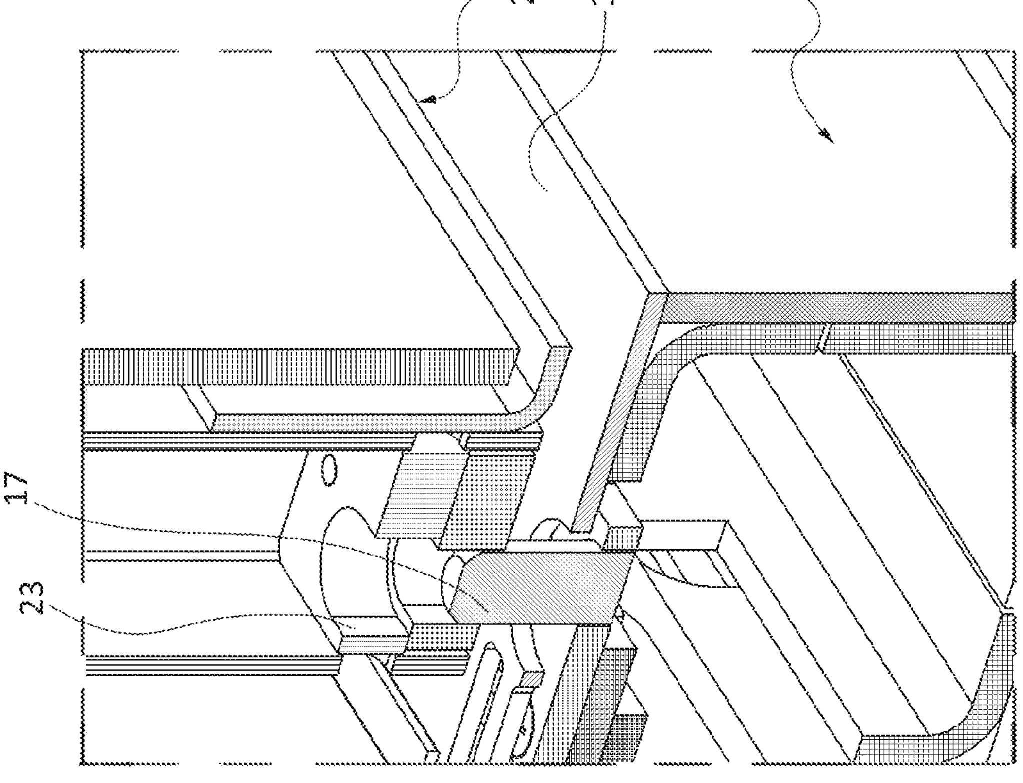

The first sash 20 is mounted at the first upright 11 of the main frame 10. In the positions shown in FIGS. 1-3, the first sash 20 is locked in rotation by engagement with a locking pin 17, shown in FIGS. 25 and 26. The locking pin 17 is mounted on a movable structure 18 arranged inside the lower cross-piece 13, and connecting the locking pin 17 to the rails 15 of the lower cross-piece 13. In this way, the locking pin is able to move integrally with the rails 15 of the lower cross-piece 13. Therefore, in the forward position of the rails 15, the locking pin 17 protrudes beyond the top wall 13*a* of the cross-piece 13, through an opening 13*c* formed in such wall (FIG. 25). In this position, the locking pin 17 engages a seat 23 arranged in the lower side of the first sash 20, preventing the first sash 20 from rotating about the axis Y thereof. In the retracted position of the rails 15, the locking pin 17 is retracted so as not to interfere with the first sash 20 (FIG. 26), and therefore the first sash is free to rotate about the axis Y thereof. A locking pin identical to the one described above is arranged in the upper cross-piece 14, and connected in the same way with the rails 16 arranged in the upper cross-piece 14.

The second sashes 30, 40 are displaceable by sliding between a first position far from the first upright 11 of the main frame 10 (shown in FIGS. 1 and 2) and a second position adjacent to said first upright 11 (shown in FIG. 3). In the second position, the second sashes 30, 40 are engageable with an abutment part 22 of the first sash 20. Such abutment part 22 protrudes orthogonally with respect to the plane defined by the first sash 20 and is integral with the first sash 20, in particular with the upright 21 thereof.

Figure 12:
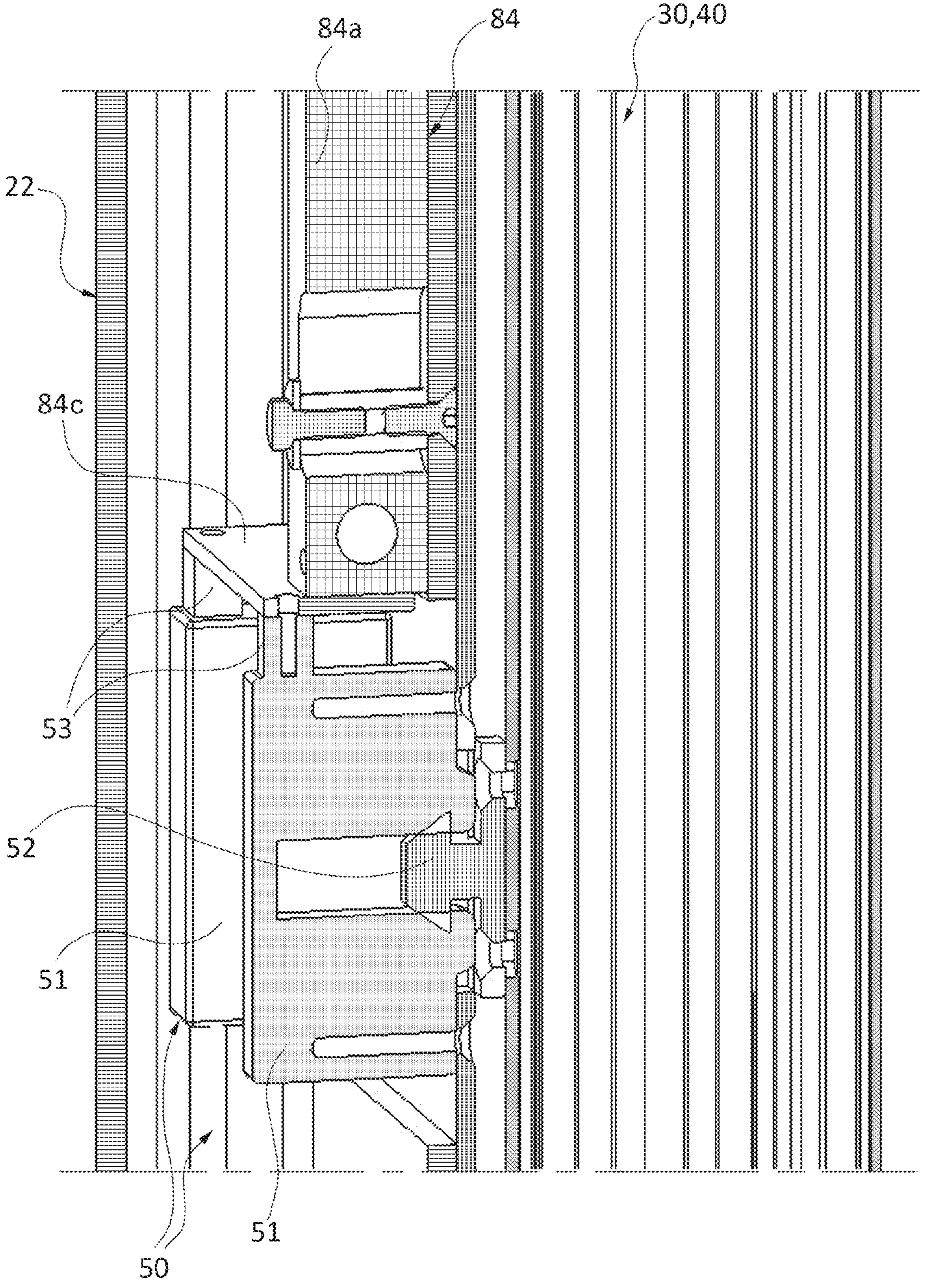
FIG. 12 is a perspective view of an internal detail of the sash pack (the view of FIG. 12 is taken along line XII-XII of FIG. 3)
Figure 14:
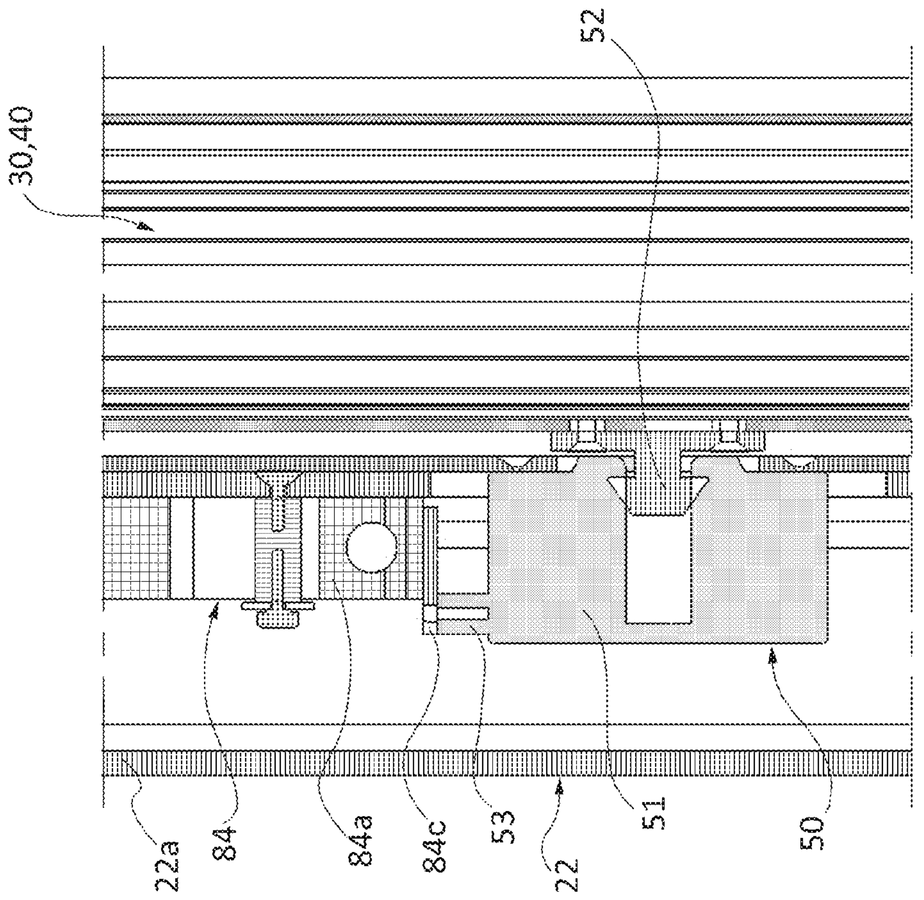
FIGS. 13 and 14 are cross-sectional views taken at different heights of a part of the sash pack, wherein FIG. 14 corresponds to the detail of FIG. 12.
Figure 13:
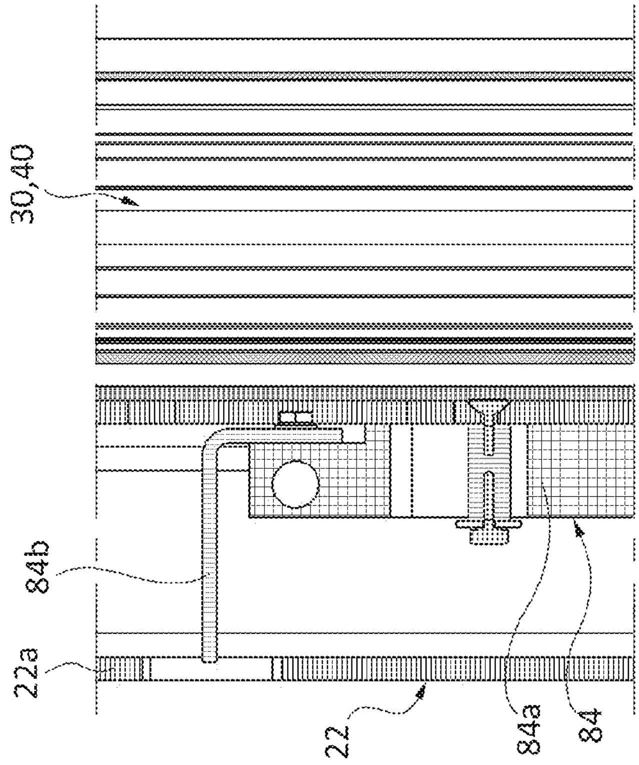

With reference to FIGS. 12-14, at least one automatic fastening device 50 of a type known per se (in the example, at least one automatic fastening device for each sliding sash 30, 40) is also provided, comprising a first spring-loaded part 51 arranged on the abutment part 22 of the first sash 20 and a second spring-loaded part 52 arranged on each of the second sashes 30, 40. An engagement between the first spring-loaded part 51 and the second spring-loaded part 52 causes a stop (not shown) to snap into the first spring-loaded part 51, which holds the second spring-loaded part 52 against the first spring-loaded part 51. The automatic fastening devices 50 are therefore configured to automatically fasten the second sashes 30, 40 to the abutment part 22 of the first sash 20 when the second sashes 30, 40 reach the second position thereof shown in FIG. 3.

Conventionally, the automatic fastening device 50 described above further comprises a spring-loaded control member 53 arranged on the first spring-loaded part 51 and operable to cause the release of the second part 52 from the first spring-loaded part 51. Once operated and then released, such spring-loaded control member 53 elastically returns to the rest position thereof. The operation of the spring-loaded control member 53 will be described hereinbelow.

In the condition shown in FIGS. 3 and 4, the first sash 20 forms with the second sashes 30, 40 coupled thereto a sash pack capable of rotating as a whole.

Figure 22:
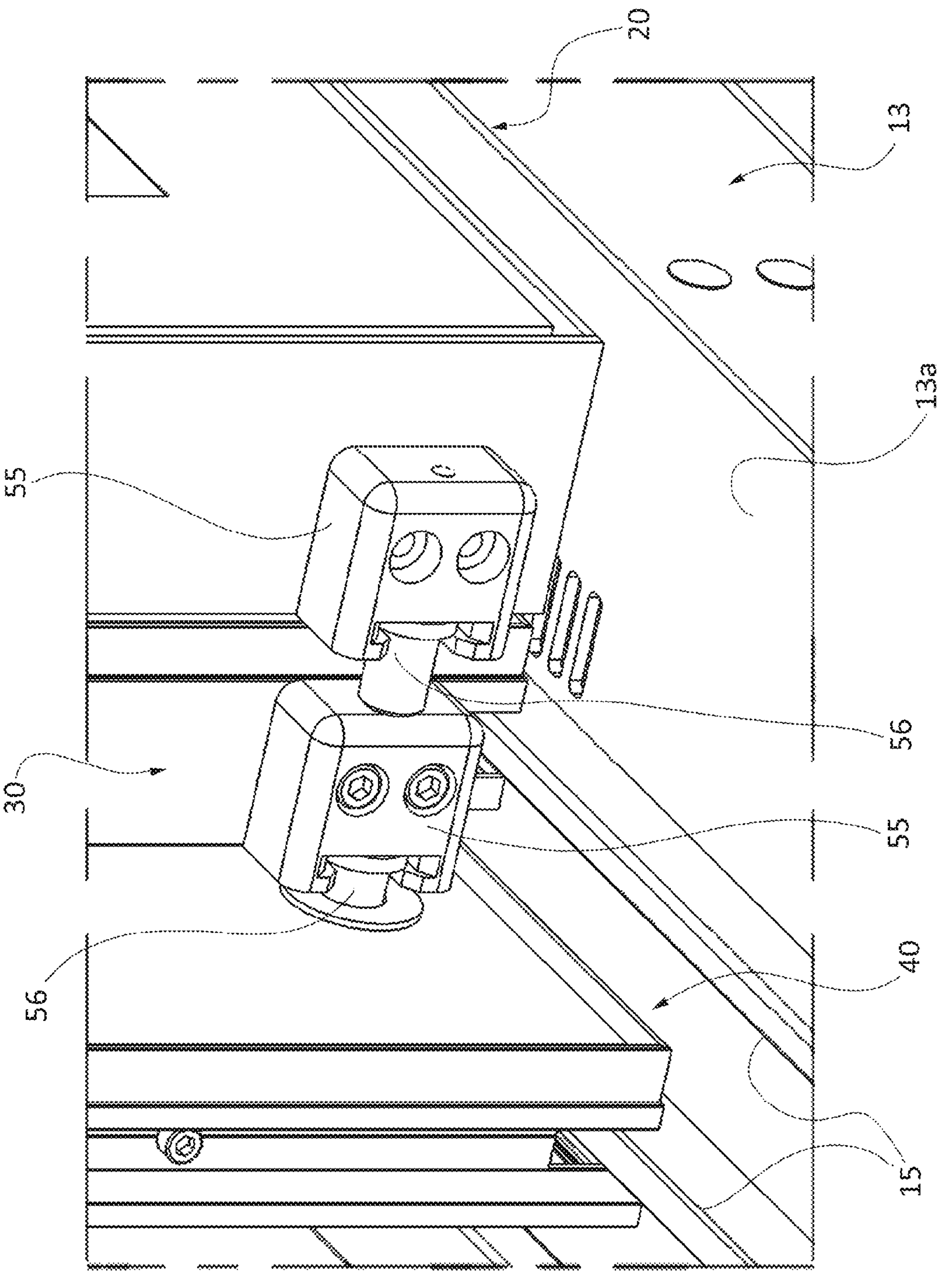
FIG. 22 is a view of the details of FIGS. 19-21 in a condition wherein the sashes are grouped together.

Means are also provided to support the second sashes 30, 40 in the packed condition shown in FIGS. 3 and 4, which in the illustrated example are shown in FIGS. 19-22 and FIGS. 23-24. The means shown in FIGS. 19-22 comprise at least one female block 55 and at least one male engagement element 56 capable of engaging a slit formed in the female block 55 to achieve a prismatic coupling between adjacent sashes when the sashes are in the grouped condition (FIG. 22). The female blocks 55 and/or the male engagement elements 56 are arranged on the side of each sash 20, 30, 40 further away from the upright 11 of the main frame 10. FIGS. 19-22 show only those elements that are arranged at the lower side of the sashes 20-40; it is however understood that similar elements are also arranged at the upper side of the sashes 20-40. The arrangement and shape of the elements may be different from that shown in FIGS. 19-22. The means shown in FIGS. 23, 24 comprise support pins 57 fastened to the abutment part 22 of the first sash 20, and capable of being inserted into respective seats 58 arranged on the uprights 31 and 41 of the second sashes 30, 40 when the sashes are in the grouped condition (FIG. 24). FIGS. 23-24 show only the elements arranged at the lower side of the sashes 20-40; it is understood, however, that similar elements are also arranged at the upper side of the sash 20-40. The arrangement and shape of the elements may be different from that shown in FIGS. 23-24.

With reference to FIGS. 7-11, the door 1 further comprises a control system 60 arranged in the main frame 10, in particular in the first upright 11, and operable to move the rails 15, 16 between the forward position thereof shown in FIG. 5 and the retracted position thereof shown in FIG. 6.

The control system 60 comprises a manually operable control element 61 mounted on the first upright 11, in particular a control element 61 rotatable about a horizontal axis X, such as a handle, shown in FIGS. 2-4. The control system 60 further comprises control transmission means connecting the rails 15, 16 to the control element 61, an example of which is shown in FIGS. 7-11. As may be seen from a comparison between FIGS. 2-3, 5 on the one hand and 4, 6 on the other hand, a first position (for example a lowered position) of the control element 61 corresponds to the forward position of the rails 15, 16, and a second position (for example a raised position) of the control element 61 corresponds to the retracted position of the rails 15, 16. According to a not-shown embodiment, the control system 60 can be a system servo-assisted by an electric actuator, which is controlled by a manually operated push-button. In this case the control transmission can be constituted in part by components of the electric actuator, and in part by any further elements connecting the electric actuator to the rails 15, 16.

In the example of FIGS. 7-11, the control transmission means comprise a gear wheel 62 which is coaxial and rotationally integral with a shaft 61*a* of the control element 61. The gear wheel 62 is coupled with two rack elements 63 extending vertically within the first upright 11 of the frame 10, wherein one thereof is connected in a force transmitting manner with the rails 15 of the lower cross-piece 13, and the other is connected in a force transmitting manner with the rails 16 of the upper cross-piece 14. The two rack elements 63 are coupled to respective rails in such a way as to be able to translate vertically, according to the direction indicated by the arrows Z1 and Z2. The rack elements 63 are coupled with diametrically opposite portions of the gear wheel 62, and therefore the two rack elements 63 are able to move in opposite directions relative to one another.

The control transmission further comprises two return rods 64, which connect the rack elements 63 with the rails 15 of the lower cross-piece 13 and with the rails 16 of the upper cross-piece 14. It should be noted, for clarity, that in the example shown, the vertical movement of each rack element 63/return rod 64 is inverted with respect to the movement of the respective rails 15, 16, with further transmission elements (such as gears), not shown in the figures, being arranged between each return rod 64 and the respective rails 15, 16.

The door 1 further comprises a first safety system arranged partly in the frame 10 and partly on the first sash 20. The first safety system 70 is switchable between two locking positions, namely a first locking position and a second locking position (shown in FIGS. 8 and 10), in which the first safety system 70 locks the control system 60 and the rails 15, 16 in the forward position and, respectively, in the retracted position, and an inactive position (shown in FIGS. 9 and 11), in which the first safety system 70 does not interfere with the control system 60. In the sliding movement configuration, the first safety system 70 is configured to be switched from the first locking position (FIG. 8) to the inactive position (FIG. 9) by virtue of the second sashes 30, 40, when the second sashes 30, 40 reach the engagement position with the abutment part 22 of the first sash 20, shown in FIG. 3. In the configuration with the hinged movement, the first safety system 70 is configured to be switched from the second locking position (FIG. 10) to the inactive position (FIG. 11) by virtue of the sash pack 20-40 insofar as such sash pack reaches the position aligned with the rails 15, 16 (i.e. the "closed" position shown in FIG. 3).

In the specific example shown, the first safety system 70 comprises a rocker arm 71 pivoted to the first upright 11 of the frame 10, and rotatable about a horizontal axis Xa orthogonal to the plane defined by the sashes 20-40. More precisely, there are two rocker arms 71 associated with the second sashes 30 and 40, respectively, and which may be rotated independently with respect to one another. In the case of a different number of second sashes, there would be a corresponding number of rocker arms.

Each rocker arm 71 is elastically loaded by a respective spring-loaded 72 arranged between the rocker arm 71 and a part integral with the first upright 11 of the frame 10. Each rocker arm 71 comprises a first end 73 engageable with a relevant pin 63*a* integral with one of the rack elements 63. In the example shown the pins 63*a* (wherein only one thereof is visible in the figures) are integral with the rack element 63 connected to the rails 16 associated with the upper cross-piece 14. In the locking positions of the first safety system 70, at least one of the pins 63*a* interferes with the relevant first end 73 of the relevant rocker arm 71 thereby preventing the movement of the rack element 63 and thus the manual actuation of the control element 61. In this way, the movement of the rails 15, 16 through the control system 60 is prevented. In particular, the first end 73 of each rocker arm 71 is provided with a first engagement portion 73*a* and a second engagement portion 73*b*, which are configured to interfere with the relevant pin 63*a* in the first locking position (FIG. 8) and in the second locking position (FIG. 9), respectively.

Each rocker arm 71 further comprises a second end 74 opposite the first end 73. The second end 74 is engageable by a respective push rod 75 arranged upon the first sash 20 for causing the respective rocker arm 71 to rotate against the action of the respective spring-load 72. As may be seen in particular in FIG. 7, the push rods 75 are arranged inside the abutment part 22 of the first sash 20, and are movable along a horizontal direction Za parallel to the plane defined by the sashes 20-40. The push rods 75 may be elastically loaded by respective springs, towards said second sashes 30, 40.

Figure 9:
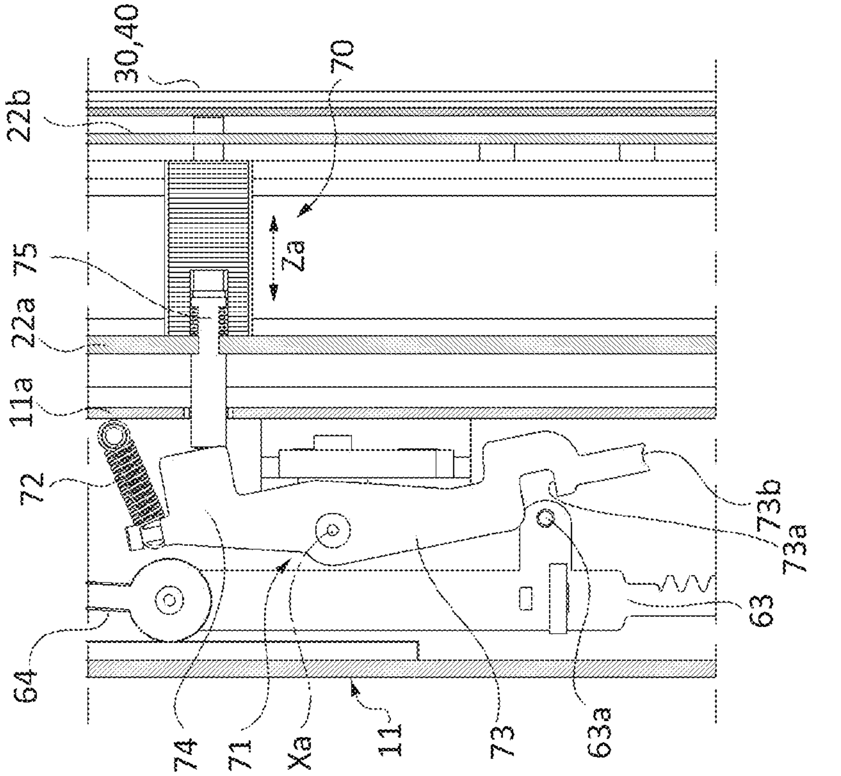
FIGS. 8 and 9 are cross-sectional views which show the safety system of FIG. 4 in a first locking position and in the inactive position, respectively (the views of FIG. 8 and FIG. 9 are taken along line VIII-VIII of FIG. 2 and line IX-IX of FIG. 3, respectively)
Figure 8:
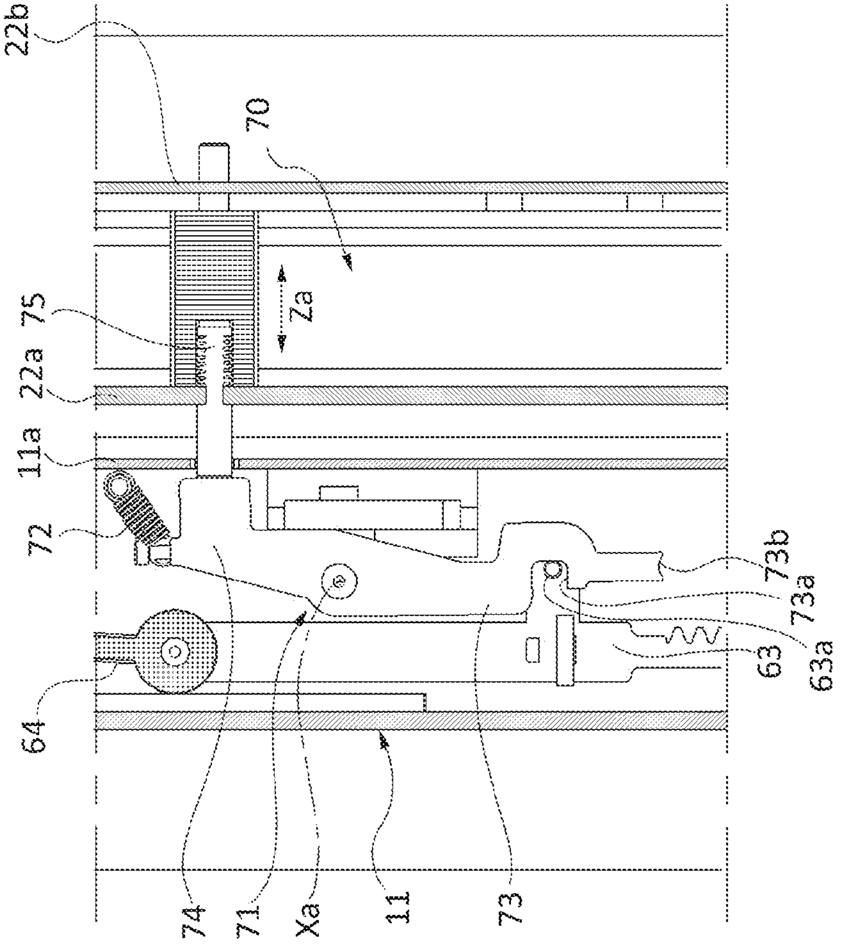

The push rods 75 each have a proximal end that protrudes towards the first upright 11 of the frame 10, through a respective opening formed in a wall 22*a* of the abutment part 22 of the first sash 20. The proximal ends of the push rods 75 are able to engage the respective rocker arms 71 through respective openings formed in a wall 11*a* of the first upright 11 of the frame 10. The push rods 75 each have a distal end protruding towards the second sashes 30, 40, through a respective opening formed in another wall 22*b* of the abutment part 22 of the first sash 20. By virtue of the arrangement described above, when all of the second sashes 30, 40 reach the engagement position with the abutment part 22 of the first sash 20 (FIG. 3), they push the respective push rods 75 against the respective rocker arms 71, causing the rotation thereof from the first locking position (FIG. 8) to the relative inactive position (FIG. 9). In this way, the control system 60 is released from the first safety system 70, allowing the rails 15, 16 to be moved (from the forward position to the retracted position) by actuating the control element 61.

Figure 11:
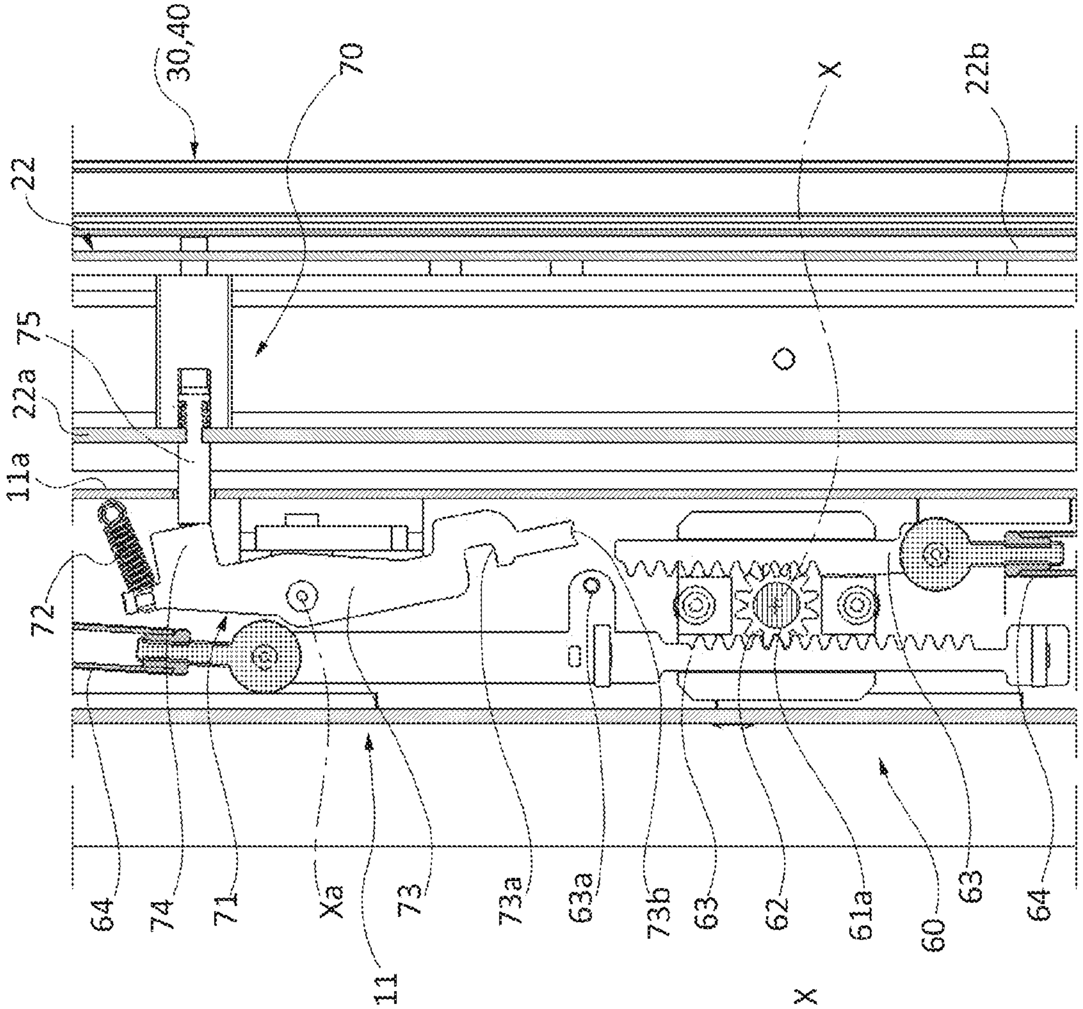
FIGS. 10 and 11 are enlarged scale views of the safety system in FIG. 4, in a second locking position and in the inactive position, respectively (the view of FIG. 11 is taken along line XI-XI of FIG. 3)
Figure 10:
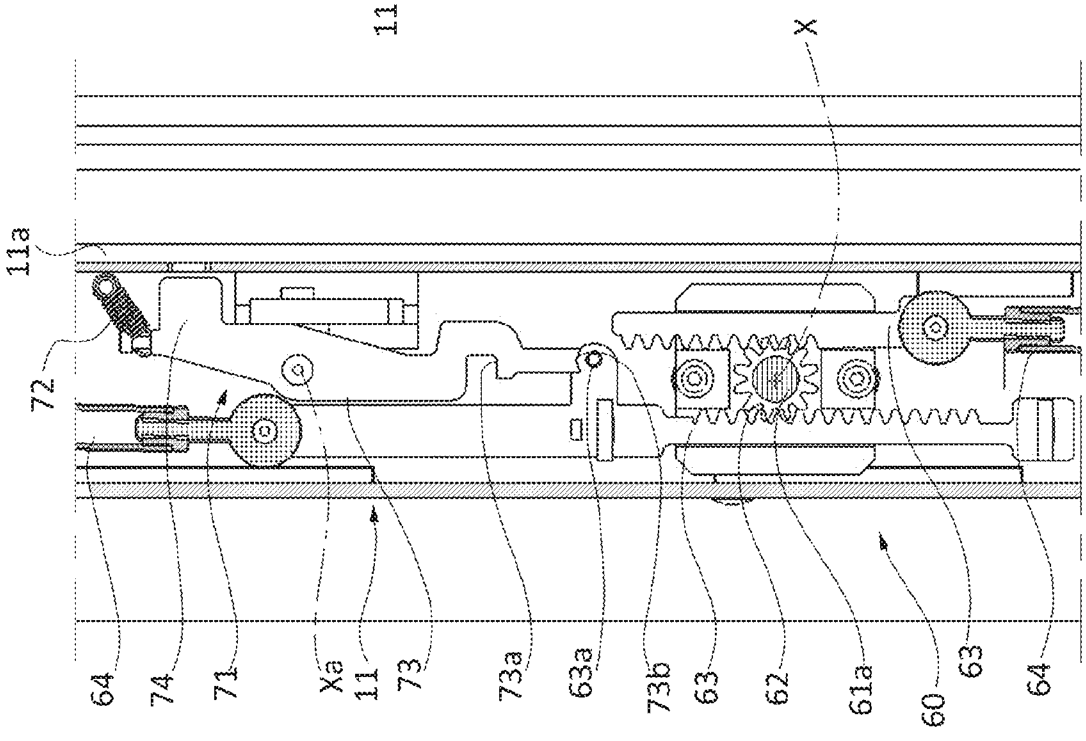

Similarly, when the sash pack 20-40 in the hinged configuration is brought into alignment with the rails 15, 16, the push rods 75 engage with the respective rocker arms 71 thereof, causing them to rotate from the second locking position (FIG. 10) to the inactive position (FIG. 11). In this way, the control system 60 is released from the first safety system 70, allowing the rails 15, 16 (from the retracted position to the forward position) to be moved by actuating the control element 61.

The door 1 further comprises a release system 80, shown in FIGS. 12-18, which is arranged partly in the frame 10 of the door 1, and partly on the first sash 20. The release system 80 is operable to act upon the automatic fastening devices 50, causing the release of the second sashes 30, 40 from the abutment part 22 of the first sash 20.

The release system 80 comprises a manually operable control element 81 mounted on the first upright 11 of the main frame 10. In particular, the manually operable control element 81 is a slider displaceable along a vertical direction, defined by a groove 82 formed on a wall of the first upright 11.

The release system 80 comprises a first transmission part 83 arranged in the first upright 11 of the main frame 10 and connected to the control element 81. The first transmission part is shown in particular in FIGS. 15 and 16, and comprises a sliding plate 83*a* mounted inside the first upright 11 and movable along a vertical direction. The sliding plate 83*a* is integral with the control element 81; the connection point between the control element 81 and the sliding plate 83*a* is indicated with 83*b*. The sliding plate 83*a* is integral with a return rod 83*c*, which has an engagement tab 83*d* at one end protruding towards the first sash 20, through an opening formed in the wall 11*a* of the first upright 11. The sliding plate 83*a* is then coupled to a spring-load 83*e*, which pushes it towards the resting position thereof.

The release system 80 further comprises a second transmission part 84 arranged in the abutment part 22 of the first sash 20. The second transmission part is shown in particular in FIGS. 12-15 and comprises a return rod 84*a* mounted to slide vertically inside the abutment part 22. An engagement tab 84*b* protruding towards the first upright 11 of the main frame 10 is fastened at one end of the return rod 84*a*, through an opening formed in the wall 22*a* of the abutment part 22 of the first sash 20 facing the first upright 11.

At the opposite end, the return rod 84*a* rests upon a control plate 84*c*, which is fastened to the spring-loaded control members 53 of the two automatic fastening devices 50 associated with the two second sashes 30, 40, respectively.

By virtue of the arrangement described above, the manual movement of the control element 81 (in particular the lowering thereof), against the action of the spring-loaded 83*e*, causes the engagement tab 83*d* of the first transmission part 83 to move, which thereby engages the engagement tab 84*b* of the second transmission part 84. The consequent movement of the return rod 84*a* of the second transmission part 84 causes the return rod to actuate the spring-loaded control members 53 of the two automatic fastening devices 50 respectively associated with the two second sashes 30, 40, causing the release of the second sashes 30, 40 from the first sash 20.

Figure 18:
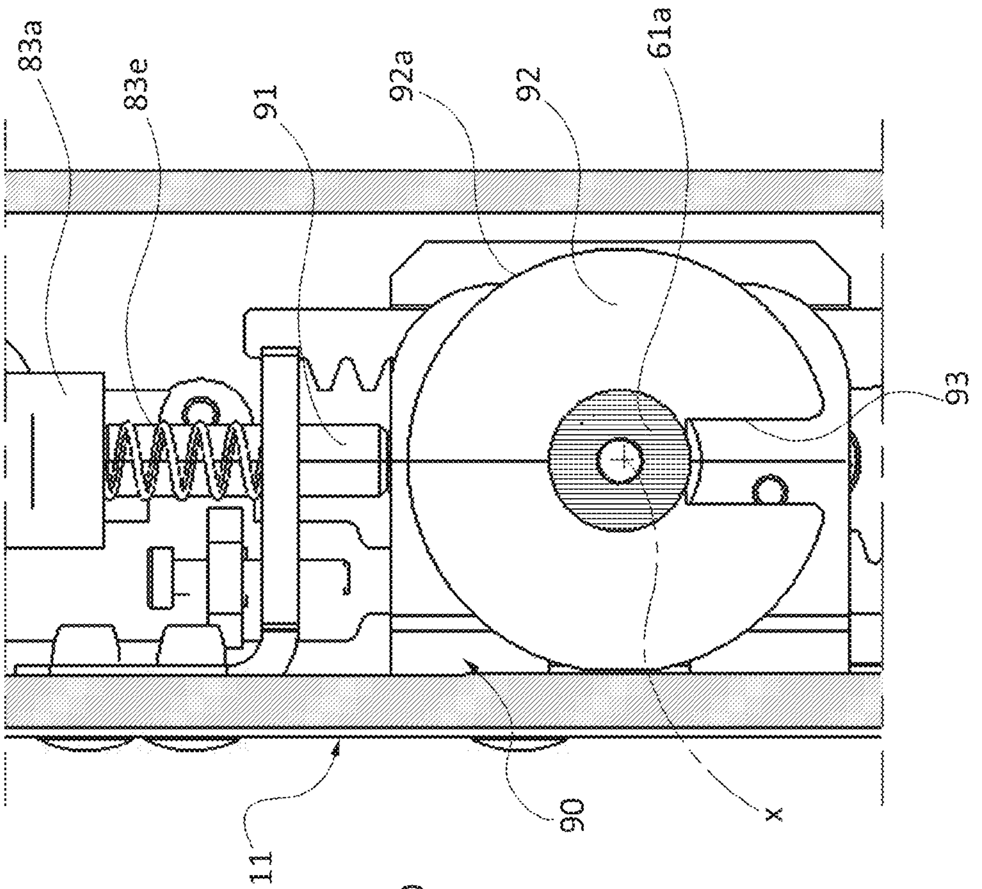
FIGS. 17 and 18 are enlarged scale views of a detail of the release system of FIG. 16, in two different operating positions (the views of FIG. 17 and FIG. 18 are taken along line XVII-XVII of FIG. 3 and line XVIII-XVIII of FIG. 4, respectively)
Figure 17:
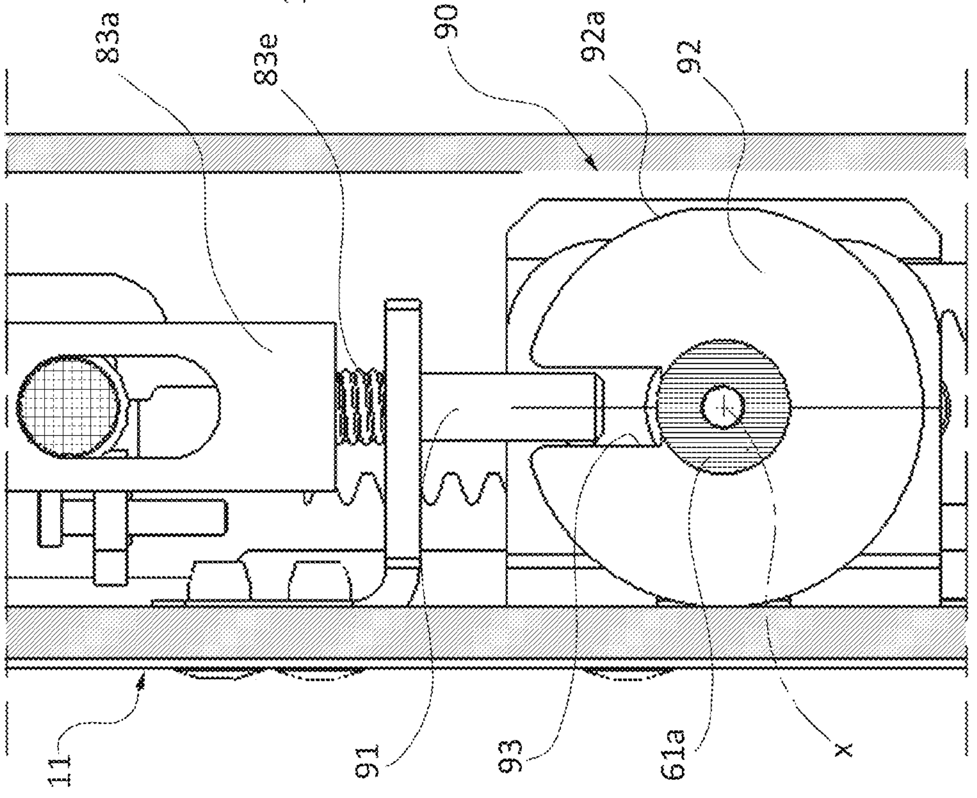
Figure 19:
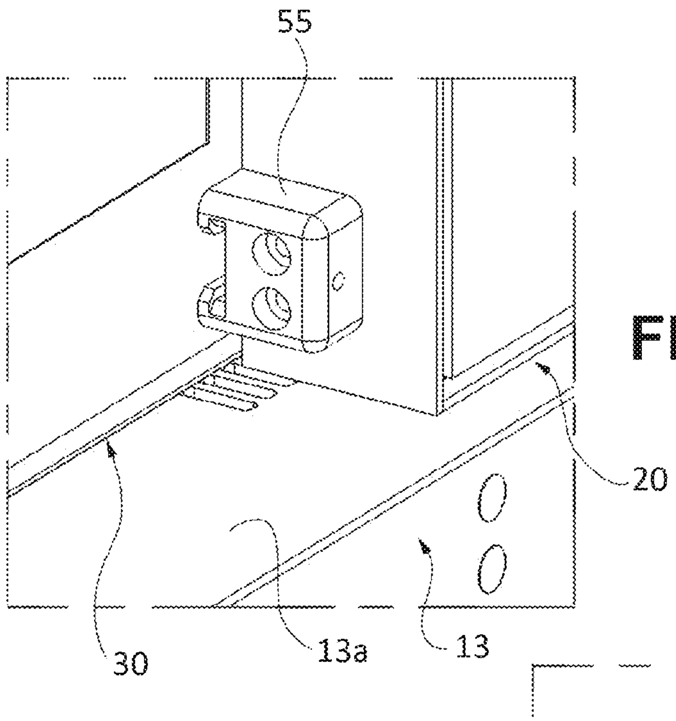
FIGS. 19, 20 and 21 are enlarged scale views of details respectively denoted by the arrows XIX, XX and XXI in FIG. 1.
Figure 20:
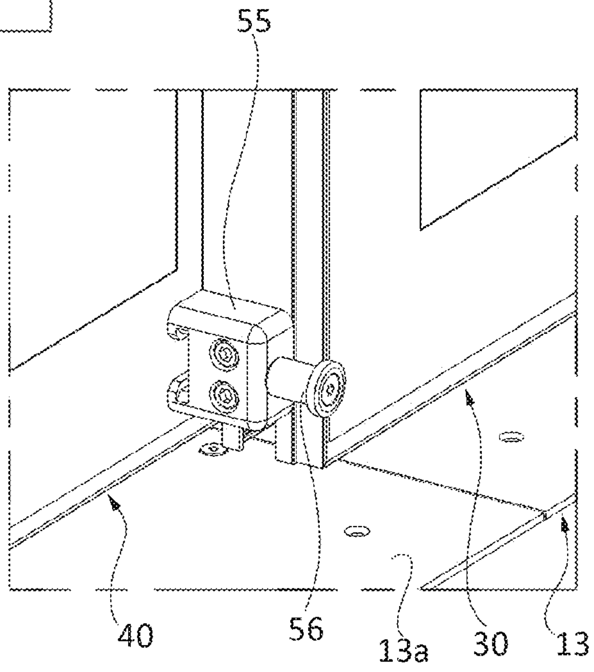
Figure 21:
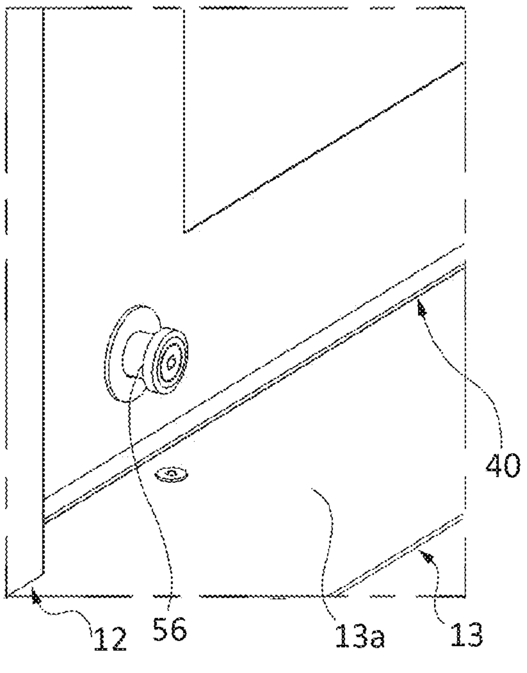

The door 1 further comprises a second safety system 90 associated with the release system 80, shown in particular in FIGS. 16-18.

The second safety system 90 comprises a push rod 91 integral in translation with the sliding plate 83*a*, and a safety disk 92 integral in rotation with the shaft 61*a* of the control element 61 of the control system 60 and arranged in front of the push rod 91. The safety disk 92 has an engagement seat 93 formed as a recess on a radially outer surface 92*a* thereof. When the safety disk 92 is arranged in the position shown in FIG. 18, the radially outer surface 92*a* of the safety disk 92 faces the push rod 91, preventing the movement thereof, and thus preventing the movement of the entire release system 80. When the safety disk 92 is arranged in the position shown in FIG. 17 (in particular, rotated 180° with respect to the position in FIG. 18), the engagement seat 93 of the safety disk 92 is able to receive the push rod 91 insofar as it faces said push rod. The push rod 91 therefore has sufficient space to move by virtue of the fact that it may penetrate the engagement seat 93, allowing the entire release system 80 to move.

The second safety system 90 is therefore switchable between a locking position (FIG. 18), wherein the second safety system 90 locks the release system 80, and an inactive position (FIG. 17), wherein the second safety system 90 does not interfere with the release system 80.

It should be noted in particular that the second safety system 90 is configured to be switched from the locked position to the inactive position (and vice versa) by the control element 61 of the control system 60. In effect, when the control element 61 (the handle) is in the position shown in FIG. 3, therefore with the rails 15, 16 in the forward position, the second safety system 90 is in the inactive position. On the other hand, when the control element 61 is in the position shown in FIG. 4, therefore with the rails 15, 16 in the retracted position or even with the entire pack formed by the sashes 20-40 in the rotated position, the second safety system 90 is in the locked position, preventing the second sashes 30, 40 from being inadvertently released.

Starting from the position shown in FIGS. 1 and 2, the second sashes 30, 40 may slide along the rails 15, 16 until reaching the position shown in FIG. 3 in which the second sashes 30, 40 engage with the abutment part 22 of the first sash 20, by virtue of the automatic fastening devices 50. Reaching the position shown in FIG. 3 causes the first safety system 70 to switch from the first locking position thereof to the inactive position thereof, this by virtue of the engagement of the push rods 75 on the part of the second sashes 30,

40. The control system 60 is thus released from the first safety system 70, and the control element 61 of the control system may be rotated from the position shown in FIG. 3 to the position shown in FIG. 4 to cause the rails 15, 16 to retract. The second sashes 30, 40 are thus released from the rails, and therefore the sash pack formed by the first sash 20 with the second sashes 30, 40 coupled thereto may rotate as a normal hinged sash. It should be noted that in the position of FIGS. 1 and 2, any undesired rotation of the first sash 20 is prevented by the coupling between the locking pin 17 of the lower cross-piece 13 and the lower side of the first sash 20, and by the coupling between the locking pin of the upper cross-piece 14 and the upper side of the first sash 20. The retraction of the rails 15, 16 also results in the retraction of the locking pins, which thus makes the first sash 20 free to rotate about the vertical axis Y.

In the configuration with a hinged movement, any undesired release of the second sashes 30, 40 is prevented by the fact that the second safety system 90 is in the locked position, by virtue of the specific position of the command element 61 (the handle) of the control system 60, thus preventing the operation of the release system 80. In turn, the control element 61 of the control system 60 may only be actuated when the sash pack 20-40 is returned to the position thereof aligned with the rails 15, 16. Otherwise, the push rods 75 arranged in the abutment part 22 of the first sash 20 would be far from the rocker arms 71 arranged within the first upright, and thus the first safety system 70 would be in the second locking position thereof which prevents the control element 61 of the control system 60 from being actuated. This prevents the rails 15, 16 from being inadvertently brought back to the forward position thereof before having moved the second sashes 30, 40 into the correct position thereof.

With the second sashes 30, 40 correctly arranged in alignment with the rails 15, 16, it is therefore possible to actuate the control element 61 (the handle) of the control system 60 to return it to the position shown in FIG. 2. This involves the rails 15, 16 passing to the forward position thereof, and the release system 80 being unlocked by the second safety system 90. The second sashes 30, 40 may then be released by actuating the control element 81 (the slider) of the release system 80.

What is claimed is:

1. A door assembly comprising:

a frame comprising a pair of uprights and a pair of cross-pieces interconnecting opposite ends of said uprights, respective rails being arranged in said cross-pieces, a first sash mounted at a first upright of the pair of uprights and configured to rotate about a vertical axis, between a closed position and an open position, at least one second sash slidingly mounted along said rails, wherein said at least one second sash is movable by sliding between a first position distant from said first upright and a second position adjacent to said first upright, wherein in said second position of said at least one second sash is engageable with an abutment part of the first sash, at least one automatic fastening device arranged partly on the abutment part of the first sash and partly on the at least one second sash and configured to automatically fasten said at least one second sash to the abutment part of the first sash when said at least one second sash reaches the second position when sliding towards the second position, and a control system arranged in the frame and operable to move said rails with respect to the respective cross-pieces, between a forward position in which said rails are engageable with said at least one second sash, and a retracted position in which said rails are non-interfering with said at least one second sash, allowing a sash pack formed by said first sash and said at least one second sash fastened to said first sash to rotate about said vertical axis, wherein the control system comprises a manually operable control element mounted to said first upright, and control transmission means connecting said rails to the manually operable control element, said control transmission means being configured to transmit motion from the manually operable control element to the rails.

2. The door assembly of claim 1, wherein the manually operable control element is rotatable about a horizontal axis.

3. The door assembly of claim 1, wherein the door further comprises a first safety system arranged partly in the frame and partly on said first sash and switchable between two locking positions, namely a first locking position and a second locking position, in which the first safety system is configured to lock the control system and said rails in the forward position and, respectively, in the retracted position, and an inactive position in which the first safety system is non-interfering with the control system, wherein the first safety system is configured to be switched from the first locking position to the inactive position by said at least one second sash, when said at least one second sash reaches said second position, wherein the first safety system is configured to be switched from the second locking position to the inactive position by said sash pack, when said sash pack reaches a position aligned with said rails, wherein the control system comprises a pair of vertically sliding elements on the one hand connected with said manually operable control element, and on the other hand respectively connected with said rails, and wherein the first safety system comprises at least one elastically biased rocker arm comprising a first end interfering with a pin integral with one of the pair of vertically sliding elements in the first and second locking positions of said first safety system, and a second end drivable by at least one push rod associated with said at least one second sash, when said at least one second sash reaches said second position, and when said sash pack reaches said position aligned with the rails.

4. The door assembly of claim 3, wherein said at least one push rod is arranged on said first sash and is horizontally movable and elastically biased towards said at least one second sash.

5. The door assembly of claim 1, further comprising a release system arranged partly in the frame and partly on the first sash, said release system being operable to act on said at least one automatic fastening device so as to release said at least one second sash from the abutment part of the first sash.

6. The door assembly of claim 5, wherein the release system comprises a manually operable control element mounted on said first upright, a first transmission part arranged in said first upright and connected to the manually operable control element of the release system, and a second transmission part arranged on the first sash and couplable to the first transmission part when the sash pack is in a position aligned with the rails, and wherein the second transmission part rests on a spring-loaded control member of said at least one automatic fastening device.

7. The door assembly of claim 6, wherein the manually operable control element of the release system is a slider displaceable along a vertical direction.

8. The door assembly of claim 5, further comprising a second safety system switchable between a locking position, in which the second safety system locks the release system, and an inactive position in which the second safety system is non-interfering with the release system.

9. The door assembly of claim 8, wherein the control system comprises the manually operable control element mounted on said first upright, and the control transmission means connecting said rails to the manually operable control element of the control system, and wherein the second safety system is configured to be switched from the locking position to the inactive position, and vice versa, by the manually operable control element of the control system.

10. A door assembly comprising:

a frame comprising a pair of uprights and a pair of cross-pieces interconnecting opposite ends of said uprights, respective rails being arranged in said cross-pieces, a first sash mounted at a first upright of the pair of uprights and configured to rotate about a vertical axis, between a closed position and an open position, at least one second sash slidingly mounted along said rails, wherein said at least one second sash is movable by sliding between a first position distant from said first upright and a second position adjacent to said first upright, wherein in said second position of said at least one second sash is engageable with an abutment part of the first sash, at least one automatic fastening device arranged partly on the abutment part of the first sash and partly on the at least one second sash and configured to automatically fasten said at least one second sash to the abutment part of the first sash when said at least one second sash reaches the second position when sliding towards the second position, and a control system arranged in the frame and operable to move said rails with respect to the respective cross-pieces, between a forward position in which said rails are engageable with said at least one second sash, and a retracted position in which said rails are non-interfering with said at least one second sash, allowing a sash pack formed by said first sash and said at least one second sash fastened to said first sash to rotate about said vertical axis, wherein the control system comprises shaft-mounted to said first upright, and control transmission means connecting said rails to the shaft, said control transmission means being configured to transmit motion from the shaft to the rails.

11. The door assembly of claim 10, further comprising a first safety system arranged partly in the frame and partly on said first sash and switchable between two locking positions, namely a first locking position and a second locking position, in which the first safety system is configured to lock the control system and said rails in the forward position and, respectively, in the retracted position, and an inactive position in which the first safety system is non-interfering with the control system, wherein the first safety system is configured to be switched from the first locking position to the inactive position by said at least one second sash, when said at least one second sash reaches said second position, and wherein the first safety system is configured to be switched from the second locking position to the inactive position by said sash pack, when said sash pack reaches a position aligned with said rails.

12. The door assembly of claim 10, further comprising a release system arranged partly in the frame and partly on the first sash, said release system being operable to act on said at least one automatic fastening device so as to release said at least one second sash from the abutment part of the first sash.

* * * * *